United States Patent
Phatak

(10) Patent No.: US 8,354,360 B2
(45) Date of Patent: Jan. 15, 2013

(54) METHOD OF SUBTERRANEAN FORMATION TREATMENT

(75) Inventor: Alhad Phatak, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 345 days.

(21) Appl. No.: 12/752,665

(22) Filed: Apr. 1, 2010

(65) Prior Publication Data

US 2011/0245113 A1 Oct. 6, 2011

(51) Int. Cl.
*C09K 8/80* (2006.01)
(52) U.S. Cl. .................. 507/213; 507/267; 507/276
(58) Field of Classification Search .......... None
See application file for complete search history.

(56) References Cited

U.S. PATENT DOCUMENTS

| | | | |
|---|---|---|---|
| 5,054,552 | A | 10/1991 | Hall et al. |
| 5,055,209 | A | 10/1991 | Bridges et al. |
| 5,804,535 | A | 9/1998 | Dobson |
| 6,976,538 | B2 | 12/2005 | Wilson et al. |
| 6,987,083 | B2 | 1/2006 | Phillippi et al. |
| 7,090,015 | B2 | 8/2006 | Todd |
| 7,216,704 | B2 | 5/2007 | Hanes, Jr. et al. |
| 2004/0206498 | A1 | 10/2004 | Phillippi et al. |
| 2006/0032636 | A1 | 2/2006 | Lord et al. |
| 2007/0281868 | A1* | 12/2007 | Pauls et al. .......... 507/213 |
| 2008/0039347 | A1* | 2/2008 | Welton et al. ........ 507/213 |
| 2008/0078545 | A1 | 4/2008 | Welton et al. |

FOREIGN PATENT DOCUMENTS

| | | |
|---|---|---|
| EP | 1617039 | 1/2006 |
| WO | 9806792 | 2/1998 |
| WO | 2008037973 | 4/2008 |

OTHER PUBLICATIONS

International Search Report and Written Opinion dated Nov. 8, 2011 for corresponding PCT Application No. PCT/US2011/028760.
Engel, H.R., et al.; 553-ft Gravel Pack Uses Clarified XC Polumer: Development and Application in Beluga River, Alaska; SPE 19750; Oct. 1989.
Underdown, D.R., et al.; Comparison of HEC and XC Polymer Gravel Pack Fluids; SPE 19751; Oct. 1989.
Houchin, L.R. et al.; Formation Damage During Gravel-Pack Completions; SPE 17166; Feb. 1988.
Wilton, B.S. et al.; Technique Improves Openhole Gravel Pack; SPE 25431; Mar. 1993.

* cited by examiner

*Primary Examiner* — John J Figueroa
(74) *Attorney, Agent, or Firm* — David G. Matthews; Rodney Warfford; Daniel Lundeen

(57) ABSTRACT

A method of treating a subterranean formation with a xanthan-viscosified cesium formate brine wherein the pH and/or another characteristic selected from density, xanthan loading, sodium formate loading, potassium formate loading and combinations thereof are modified to delay solid hydrogel formation and maintain pumpability. Also disclosed is a method of delaying onset of solid hydrogel formation, in a gel comprising cesium formate brine viscosified with xanthan polymer, comprises introducing acid into the brine in an amount effective for a pH from 7 to 11, wherein the acid introduction is before, during or after xanthan viscosification and prior to hydrogel formation, wherein the hydrogel formation in the acidified gel occurs at a later time relative to the same gel at a natural pH.

21 Claims, No Drawings

METHOD OF SUBTERRANEAN FORMATION TREATMENT

CROSS REFERENCE TO RELATED APPLICATION

None.

BACKGROUND OF THE INVENTION

This invention relates to methods of treating a subterranean formation, and in particular to treatment methods with a high density brine and xanthan gum.

Xanthan gum is often used to viscosify brines to prepare gravel packing fluids. References disclosing xanthan fluids for gravel packing include, for example, U.S. Pat. No. 6,976,538, U.S. Pat. No. 6,987,083, U.S. Pat. No. 7,090,015, U.S. Pat. No. 7,216,704 and WO 98/06972. However, applicant has found that xanthan-viscosified cesium formate brines can form solid or solid-like hydrogels over a period of time. As used herein, the terms "hydrogel," "viscous hydrogel," and "solid hydrogel" refer interchangeably to solid or solid-like xanthan-containing brines, as distinguished from the term "gel" which refers to xanthan-viscosified brines that have a viscosity on the order of tens, hundreds or perhaps thousands of mPa-s so that they readily flow and can be easily pumped through a pipe or tubing. The formation of such high viscosity hydrogels is detrimental to the use of these fluids for well treatment operations such as gravel packing, due to the anticipated difficulty of pumping these materials. There exists a need for a method to prepare xanthan-viscosified brines comprising cesium formate.

SUMMARY OF THE INVENTION

We have discovered in one embodiment that lowering the pH of cesium formate brine can alleviate the problem of solid-like hydrogel formation and result in pourable xanthan-cesium formate gels that can be easily pumped. The time that a fluid takes to form hydrogels is strongly dependent on the pH of the fluid. In one embodiment involving off-shore gravel packing operations performed using treating vessels, the fluid may be mixed at the dock or on the boat while being transported to the treating location. In such a scenario, it is imperative that the fluid be resistant to solid-like hydrogel formation over long time frames, sometimes on the order of several days.

In one embodiment, a method comprises: mixing a gelling agent comprising xanthan polymer in a brine comprising cesium formate to form a mixture of the xanthan polymer in the brine, wherein the mixture has a density of at least 1.44 g/cm$^3$ (12 lbm/gal); lowering the pH of the brine; hydrating the xanthan polymer; and treating a subterranean formation with the mixture.

In various embodiments, the pH is lowered below 11.4, to 11 or less, to 10.5 or less, 10 or less, 9.5 or less, or to between 9.5 and 11.4. In embodiments the pH is not lowered to less than 7, less than 7.5, less than 8, less than 8.5, or less than 9. In one particular embodiment, the pH of the brine is lowered to between 7 and 11. In an embodiment, lowering the pH comprises adding acid to the brine, e.g., an organic acid such as formic acid, or a mineral acid. In embodiments, the acid is added to the brine in advance of mixing the gelling agent, concurrently therewith, or thereafter before any solid hydrogel formation.

In embodiments, the mixture has a density of at least 1.44 g/mL (12 lbm/gal), at least 1.5 g/mL (12.5 lbm/gal), at least 1.56 g/mL (13 lbm/gal), at least 1.62 g/mL (13.5 lbm/gal), at least 1.68 g/mL (14 lbm/gal), at least 1.74 g/mL (14.5 lbm/gal), at least 1.8 g/mL (15 lbm/gal), at least 1.86 g/mL (15.5 lbm/gal), or at least 1.92 g/mL (16 lbm/gal).

In an embodiment, the brine comprises a combination of cesium formate with sodium formate, potassium formate or a combination thereof.

In embodiments, the xanthan polymer can be hydrated in the mixture during or after the mixing. In another embodiment, the xanthan polymer is hydrated in a pre-batch, wherein the pre-batch has a density less than the density of the mixture in the formation treatment. In one embodiment, the xanthan polymer is hydrated in a first aqueous solution of cesium formate, potassium formate, sodium formate or a combination thereof, and the density of the first aqueous solution is thereafter increased by adding concentrated cesium formate, e.g., cesium formate solids, a saturated cesium formate slurry or a second aqueous solution of cesium formate wherein the second solution has a higher density than that of the first aqueous solution.

In embodiments, the treatment can comprise gravel packing, hydraulic fracturing or a combination thereof. In an embodiment, the treatment comprises alternate-path delivery of the mixture to the formation. In an embodiment, the treatment fluid comprises a shale stabilizer. In embodiments, the mixture further comprises a poppant, a crosslinker for the xanthan polymer, a breaker for the xanthan polymer, a friction reducer, or a combination thereof. In one embodiment, the breaker comprises an alkali metal bromate, e.g., potassium bromate.

In another embodiment, the method comprises: determining the treatment density, viscosity and time window for a treatment of a subterranean formation with a mixture of xanthan polymer in a cesium formate brine; determining a maximum pH required to maintain pumpability of the mixture over the treatment time window; mixing a gelling agent comprising the xanthan polymer in the cesium formate brine to form the mixture of the xanthan polymer in the brine, wherein the mixture has the determined treatment density and viscosity; adding acid before, during or after the mixing in an amount effective to lower the pH of the mixture to less than a value that is 0.5 pH units below the determined maximum pH to maintain pumpability; and treating the subterranean formation with the mixture.

In another embodiment, a method of delaying onset of solid hydrogel formation, in a gel comprising cesium formate brine viscosified with xanthan polymer and having a density of at least 1.44 g/mL (12 lbm/gal), comprises introducing acid into the brine in an amount effective for a pH from 7 to 11, wherein the acid introduction is before, during or after xanthan viscosification and prior to hydrogel formation, wherein the hydrogel formation in the acidified gel occurs at a later time relative to the same gel at a natural pH.

DETAILED DESCRIPTION OF THE INVENTION

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components others than the ones already cited. In the summary of the invention and this detailed description, each numerical value should be read once as modified by the term "about" (unless already expressly so modified), and then read again as not so modified unless otherwise indicated in context.

Treatment methods of invention are useful in oilfield operations, including such operations as fracturing subterranean formations, modifying the permeability of subterranean formations, fracture or wellbore cleanup, acid fracturing, matrix acidizing, gravel packing or sand control, and the like. These methods can be used at any suitable formation temperature.

The xanthan polymer is incorporated into fluids used in embodiments in amounts ranging from about 0.01% to about 5.0% by weight of total weight of liquid phase, and preferably from about 0.05% to about 1%, for example, 0.6-0.9% or 0.7-0.8% by weight of total weight of liquid phase. The term liquid phase means all components of the fluid except any gas component or entrained solids.

In some embodiments, the xanthan polymer may be crosslinked with a suitable crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent metal ion such as, but not necessarily limited to, chromium, iron, boron, aluminum, titanium, and zirconium.

Methods of the invention may also comprise a breaker used in the fluid, for example, a bromated such as potassium bromate. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In a preferred embodiment, a bromated breaker such as potassium bromated is effective, particularly at treatment temperatures above 93° C. (200 F) and especially in alkali metal formate brines which have a stabilizing effect on xanthan gels.

Fluids useful in method of the invention may also include shale stabilizers such as, for example, potassium chloride, ammonium chloride, tetramethyl ammonium chloride, and the like; polyamines and polyol compounds (see U.S. Pat. No. 6,857,485 and U.S. Pat. No. 7,084,092, incorporated herein by reference) and polyoxyalkylene polyamines such as diamine ethers of the formula $H_2$—N—R-(0-R')$_x$—NH$_2$ wherein R and R' are alkylene of from 1 to 6 carbon atoms and x has a value from 1 to 10, or an acid addition product thereof (see U.S. 2009/065207, incorporated herein by reference); and combinations thereof.

Fluids useful in method of the invention may also include filter cake removal agents, such as, for example, chelating agents; acids or acid precursors such as polylactides (PLA) and polyglycolides (PGA); dispersing agents such as organic amino phosphonic acids, esters and salts thereof; and so on.

Fluids useful in methods of the invention may also include proppant particles that are substantially insoluble in the fluids of the formation. As used herein, the term proppant is also inclusive of gravel used in gravel packing and sand control. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. In the case of gravel used in gravel packing or frac-and-pack treatments, a mesh size between 8 and 70 U.S. Standard Sieve Series mesh is used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

Friction reducers may also be incorporated in an embodiment. Any friction reducer polymer such as polyacrylamide and copolymers, partially hydrolyzed polyacrylamide, poly (2-acrylamido-2-methyl-1-propane sulfonic acid) (polyAMPS), and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 may be mentioned. These polymeric species added as friction reducers or viscosity index improvers may also act as excellent fluid loss additives reducing or even eliminating the need for conventional fluid loss additives. Latex resins or polymer emulsions may be incorporated as fluid loss additives.

The aqueous medium used in method embodiments of the invention is a cesium formate brine. In brine may include, in addition to the cesium formate salt, an inorganic salt or another organic salt. Preferred inorganic salts include alkali metal halides, more preferably potassium chloride. The carrier brine phase may also comprise another organic salt more preferably sodium or potassium formate. In one embodiment, the brine includes a combination of cesium formate with potassium formate and/or sodium formate, where potassium formate and/or sodium formate can replace the cesium formate to the extent that the required density of the brine is maintained. Preferred inorganic divalent salts include calcium halides, more preferably calcium chloride or calcium bromide. Sodium bromide, potassium bromide, or cesium bromide may also be used. The salt is chosen for compatibility reasons in one embodiment, e.g., where the reservoir drilling fluid used a particular brine phase and the completion/clean up fluid brine phase is chosen to have the same brine phase.

Fluids used in method embodiments of the invention may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, organic solvents, scale inhibitors, corrosion inhibitors, fluid-loss additives, bactericides, biocides, and the like. Also, they may include a co-surfactant to optimize viscosity or to minimize the formation of stable emulsions that contain components of crude oil or at least one additional polysaccharide polymer comprising 1,2-cis hydroxyls or chemically modified polysaccharide polymer comprising 1,2-cis hydroxyls, such as cellulose, derivatized cellulose, guar gum, derivatized guar gum, or synthetic polymers such as polyacrylamides and polyacrylamide copolymers. The fluids used in the invention may also contain a ligand such as a polyol comprising 1,2-cis hydroxyls (glycerol, sorbitol, gluconic acid salts, mannitol, and the like, by non limiting example), oxygen scavengers such as sodium thiosulfate or even oxidizers such as ammonium persulfate, peroxides, and sodium bromate.

When organic solvents are incorporated into fluids, any suitable solvent may be used. Also, a plurality of solvents may be incorporated. Examples of suitable solvents include hydrocarbons, such as mineral oil, oxygenated solvents, such as glycol ethers, alcohols, ethers, ketones, esters, biodiesel, oxygenated/hydrocarbon solvent mixtures, and the like. Organic solvents are typically incorporated in an amount from about 0.05% to about 70% by weight based on total liquid phase weight, preferably from about 0.1% to about 35% by weight based on total liquid phase weight.

Another embodiment of the invention includes the use of fluids of the invention for hydraulically fracturing a subterranean formation. Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference thereto.

In most cases, a hydraulic fracturing consists of pumping a proppant-free viscous fluid, or pad, usually water with some fluid additives to generate high viscosity, into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing when the pumping pressure is released. The proppant suspension and transport ability of the treatment base fluid traditionally depends on the type of viscosifying agent added.

In some fracturing treatments, fluids of the invention may be used in the pad treatment, the proppant stage, or both. The components of the liquid phase are preferably mixed on the surface. Alternatively, a the fluid may be prepared on the surface and pumped down tubing while the gas component could be pumped down the annular to mix down hole, or vice versa. In another embodiment, the treatment fluid is prepared offsite and transported to the well site and used in the treatment method before a solid hydrogel forms. For example, at an offshore well location, the treatment fluid can be prepared at the dock or mixed in transit on the boat to the well site.

Hydration of the xanthan polymer may be performed at the treating location or away from the treating location, depending on the rate at which the polymer hydrates in brine. This rate is strongly dependent on the density of brine being used and the pH of the fluid during hydration. In an embodiment involving off-shore treatments, xanthan hydration may be carried out at the dock or in the treatment boat on the way to the treating location. To lower the pH of the brine, acid may be added prior to adding xanthan or immediately after adding xanthan. To enhance the rate of hydration, the xanthan polymer may alternately be hydrated in lower-than-required density cesium formate brine, followed by addition of cesium formate salt or saturated cesium formate brine to the hydrated xanthan mixture.

Solid hydrogel formation in xanthan-cesium formate brines is dependent on several factors, including, for example, the xanthan concentration, pH of the fluid, the brine density, and the time allowed after preparation for the hydrogel to form. The pH of the fluid also impacts the ability to break the xanthan polymer after a gravel packing and/or fracturing treatment, for example. In an embodiment, the desired fluid pH value can be determined based on the bottomhole temperature of the formation to be treated and breaker tests at that temperature. In another embodiment, the amount of time between xanthan hydration and gravel packing treatment is ascertained, and the xanthan concentration, pH and/or brine density are adjusted to obtain the desired time plus any suitable buffer before hydrogel (plug) formation. Based on these factors, in one embodiment, an optimum pH of the fluid at which it does not form hydrogels for the time required, and at which the fluid can be broken at the bottomhole temperature at a preferred rate are determined.

In unconsolidated formations, sand control measures are implemented to prevent wellbore collapse. Common practice for controlling sand displacement includes placement of a gravel pack to hold formation sand in place. In an embodiment, the present invention relates to formation treatment involving gravel packing a wellbore. As a gravel packing fluid, the treatment fluid preferably comprises gravel or sand and other optional additives such as filter cake clean up reagents such as chelating agents or acids (e.g. hydrochloric, hydrofluoric, formic, acetic, citric acid) corrosion inhibitors, scale inhibitors, biocides, leak-off control agents, among others. For this application, suitable gravel or sand typically has a mesh size between 8 and 70 U.S. Standard Sieve Series mesh.

The gravel pack is typically deposited around a perforated liner or screen. The gravel pack filters the sand while still allowing formation fluid to flow through the gravel, the screen and a production pipe. To alleviate the difficulties raised by long or inclined intervals, gravel packing may be carried out with a technique referred to in the art as alternate path delivery. Alternate-path delivery tools include, for example, perforated shunts adapted to receive the gravel slurry as it enters the annulus around the screen. These shunts provide alternate paths that allow the gravel slurry to be delivered even if a bridge forms in the gravel before the operation is completed. The alternate path technology incorporates a special gravel pack screen system that contains perforated "shunt-tubes" or alternate flow paths, attached to the sides of the screen. The perforated shunts are adapted to receive the gravel slurry as it enters the annulus around the screen. These shunt tubes permit effective gravel packing by allowing the fluid to flow around a bridged zone if gravel bridging should occur before the operation is completed. Thus even long horizontal sections can be gravel packed even if there is high fluid loss. A complete description of a typical alternate-path gravel pack tool and its operation can be found for instance in U.S. Pat. No. 4,945,991; U.S. Pat. No. 5,082,052; U.S. Pat. No. 5,113,935; U.S. Pat. No. 5,341,880; U.S. Pat. No. 5,419,394; U.S. Pat. No. 5,435,391; U.S. Pat. No. 5,476,143; U.S. Pat. No. 5,515,915; U.S. Pat. No. 6,220,345; and U.S. Pat. No. 6,883,608; each of which is hereby incorporated by reference in its entirety.

Accordingly, the invention provides the following embodiments:

1. A method, comprising: mixing a gelling agent comprising xanthan polymer in a brine comprising cesium formate to form a mixture of the xanthan polymer in the brine, wherein the mixture has a density of at least 1.44 g/mL (12 lbm/gal); lowering the pH of the brine; hydrating the xanthan polymer; and treating a subterranean formation with the mixture.
2. A method, comprising: determining the treatment density, viscosity and time window for a treatment of a subterranean formation with a mixture of xanthan polymer in a cesium formate brine; determining a maximum pH required to maintain pumpability of the mixture over the treatment time window; mixing a gelling agent comprising the xanthan polymer in the cesium formate brine to form the mixture of the xanthan polymer in the brine, wherein the mixture has the determined treatment density and viscosity; adding acid before, during or after the mixing in an amount effective to lower the pH of the mixture to less than a value that is 0.5 pH units below the determined maximum pH to maintain pumpability; and treating the subterranean formation with the mixture.
3. A method of delaying onset of viscous hydrogel formation in a gel comprising a mixture of cesium formate brine viscosified with xanthan polymer and having a density of at least 1.44 g/mL (12 lbm/gal), comprising introducing acid into the brine in an amount effective for a pH from 7 to 11, wherein the acid introduction is before, during or after xanthan viscosification and prior to hydrogel formation, wherein the hydrogel formation in the acidified gel occurs at a later time relative to the same gel at a natural pH.
4. The method of any one of embodiments 1 or 2 wherein the pH of the brine is lowered below 11.
5. The method of any one of embodiments 1 or 2 wherein the pH of the brine is lowered to between 7 and 11.
6. The method of any one of embodiments 1, 2, 4 or 5 wherein the lowering of the pH comprises adding acid to the brine.
7. The method of embodiment 3 or embodiment 6 wherein the acid comprises an organic acid.
8. The method of any preceding embodiment wherein the lowering of the pH comprises adding acid to the brine in advance of the mixing of the gelling agent.
9. The method of any preceding embodiment wherein the lowering of the pH comprises adding acid to the brine concurrently with the mixing of the gelling agent.
10. The method of any preceding embodiment wherein the lowering of the pH comprises adding acid to the mixture before any viscous hydrogel formation.
11. The method of any preceding embodiment wherein the mixture has a density of at least 1.56 g/mL (13 lbm/gal).
12. The method of any preceding embodiment wherein the mixture has a density of at least 1.8 g/mL (15 lbm/gal).
13. The method of any preceding embodiment wherein the brine comprises a combination of cesium formate with sodium formate, potassium formate or a combination thereof.
14. The method of any preceding embodiment wherein the xanthan polymer is hydrated in the mixture during or after the mixing.
15. The method of any preceding embodiment comprising hydrating the xanthan polymer in a pre-batch, wherein the pre-batch has a density less than the density of the mixture in the formation treatment.
16. The method of any preceding embodiment wherein the xanthan polymer is hydrated in a first aqueous solution of cesium formate, potassium formate, sodium formate or a combination thereof, and wherein the density of the first aqueous solution is thereafter increased by adding concentrated cesium formate.
17. The method of embodiment 16 wherein the concentrated cesium formate comprises cesium formate solids, a saturated cesium formate slurry or a concentrated aqueous solution of cesium formate wherein the concentrated solution has a higher density than that of the first aqueous solution.
18. The method of any preceding embodiment including treatment of the subterranean formation wherein the treatment comprises gravel packing, hydraulic fracturing or a combination thereof.
19. The method of any preceding embodiment including treatment of the subterranean formation wherein the treatment comprises alternate-path delivery of the mixture to the formation.
20. The method of any preceding embodiment wherein the mixture further comprises a shale stabilizer, a proppant, a crosslinker for the xanthan polymer, a breaker for the xanthan polymer, a filter cake removal agent, a friction reducer or a combination thereof.
21. The method of embodiment 20 wherein the breaker comprises an alkali metal bromate.

The following examples are presented to illustrate some embodiments of the invention, and should not be construed to limit the scope of the invention, unless otherwise expressly indicated in the appended claims. All percentages, concentrations, ratios, parts, etc. are by weight unless otherwise noted or apparent from the context of their use.

EXAMPLES

The following examples illustrate the compositions and methods of the present invention, as described in the preferred embodiments. In the following examples, XS refers to Flow Vis-L xanthan slurry in mineral oil from Kelco, having a xanthan concentration of approximately 0.48 g/mL. The brine containing cesium formate alone, the brine was prepared from cesium formate brine having a density of 1.92 g/mL (16 lbm/gal) unless otherwise noted. For mixed brines, the brines were saturated, i.e., 2.19 g/mL (18.3 lbm/gal) cesium formate brine, 1.57 g/mL (13.1 lbm/gal) potassium formate brine, and 1.32 g/mL (11.1 lbm/gal) sodium formate brine. For pH reduction where used, 37% hydrochloric acid was added; and for pH increase, sodium hydroxide was added. The xanthan slurry was mixed in the brine using a WARING blender for 1 hour and the mixture subsequently placed at 21° C. under static condition for observation. For observation, the sample was tipped at the indicated time to see if the sample was either a pourable gel (P) or a solid plug or hydrogel (S).

Example 1

Effect of Xanthan Concentration at a Fixed pH (11.5) and Brine Density (1.92 g/mL (16 lbm/gal))

Sample A1 was prepared by adding 0.75 ml of XS to 100 ml of 1.92 g/mL (16 lbm/gal) cesium formate brine and mixed in a WARING blender for 1 hour and subsequently placed at 21° C. under static condition, as described above. This concentration of xanthan slurry amounts to a xanthan concentration of 3.6 g/L (30 pounds-per-thousand-gallons (ppt)) of brine. Samples B1 and C1 were prepared in a similar manner except that 1.0 and 1.5 ml of XS were used. The fluids were observed at periodic intervals and the observations are noted in Table 2.

TABLE 1

Observations of xanthan-cesium formate gels prepared using various concentrations of xanthan at pH = 11.5 ± 0.1.

| Sample | Xanthan, g/L (ppt) | Observation | |
|---|---|---|---|
| | | 3 hours | 8 hours |
| A1 | 3.6 (30) | P | S |
| B1 | 4.8 (40) | P | S |
| C1 | 7.2 (60) | S | S |

Notes for Table 1:
"S": Solid plug (hydrogel)
"P": Pourable gel

This example shows that the formation of a solid plug can be delayed by lowering the xanthan concentration. However, the formation of the solid plug cannot be avoided even at concentrations as low as 3.6 g/L (30 ppt). In one embodiment, the xanthan loading can be adjusted to delay or avoid hydrogel formation. In many embodiments, the xanthan concentration may be fixed by the fluid viscosity requirements, e.g., for performing a gravel packing treatment. In other words, xanthan concentration is not an adjustable parameter in certain embodiments.

Example 2

Effect of Brine Density at a Fixed pH of 11.4 and Polymer Concentration of 4.8 g/L (40 ppt).

Sample A2 was prepared as described above by adding 1 ml of XS to 100 ml of 1.92 g/mL cesium formate brine for a xanthan concentration of 4.8 g/L (40 ppt). Sample B2 was similarly prepared except that the cesium formate brine had a density of 1.5 g/mL (12.5 lbm/gal). The pH of Sample B2 was adjusted using sodium hydroxide. The fluids were observed at periodic intervals and the observations are noted in Table 2.

TABLE 2

Observations of xanthan-cesium formate gels prepared using various brine densities and 4.8 g/L (40 ppt) of xanthan at pH = 11.4 ± 0.1.

| Sample | Brine density, g/mL (lbm/gal) | Observation | | |
|---|---|---|---|---|
| | | 2 hours | 8 hours | 1 day |
| A2 | 1.92 (16) | P | P/S | S |
| B2 | 1.5 (12.5) | P | P | P |

Notes for Table 2:
"S": Solid plug (hydrogel)
"P": Pourable gel

This example demonstrates that lowering the brine density can significantly delay solid hydrogel formation according to an embodiment of the invention. In many embodiments, however, the brine density may be dictated by well control requirements, and may not be an adjustable parameter.

Example 3

Effect of pH at a Fixed Brine Density (1.92 g/mL (16 lbm/gal))

Sample A3 was prepared by adding 1.5 ml of XS to 100 ml of cesium formate brine as described above. The pH of this fluid was 11.4, measured without dilution. Samples B3 and C3 were prepared in a similar manner except that the pH of the brine was lowered prior to the xanthan addition, and the pH of these fluids was 10.4 (B3) and 9.5 (C3), measured without dilution. The fluids were observed at periodic intervals and the observations are noted in Table 3.

TABLE 3

Observations of xanthan-cesium formate gels prepared at various pH values and a xanthan concentration of 7.2 g/L (60 ppt).

| Sample | pH | Observation | | | | |
|---|---|---|---|---|---|---|
| | | 3 hours | 1 day | 5 days | 9 days | 15 days |
| A3 | 11.4 | S | S | S | S | S |
| B3 | 10.4 | P | P | S | S | S |
| C3 | 9.5 | P | P | P | P | P |

Notes for Table 3:
"S": Solid plug (hydrogel)
"P": Pourable gel

The data in Table 3 show that at the natural pH of the cesium formate brine, the xanthan fluid forms an undesirable solid plug within a few hours. As the pH of the xanthan-cesium formate fluid is reduced, the solid plug formation takes longer to form. Thus, lowering the pH of the fluid is an effective way of increasing the suitable hydration-to-treatment times of a xanthan-cesium formate fluid. This facilitates the use of such a fluid in treatments where the time between hydration and pumping is expected to be several days.

Example 4

Effect of pH in Mixed Potassium Formate/Cesium Formate Brine

The brine used in Samples A4 and B4 was prepared by mixing saturated potassium formate brine with saturated cesium formate brine to a density of 1.92 g/mL (16 lbm/gal). Sample A4 was prepared by adding 1.5 mL XS to 100 mL of the mixed brine as described above to provide a xanthan polymer concentration of 7.2 g/mL (60 ppt). The pH of this fluid was modified to 11.5, measured without dilution. Sample B4 was prepared in a similar manner except that the pH of the brine was modified to 8.5 prior to the xanthan addition. The fluids were observed at periodic intervals and the observations are noted in Table 4.

TABLE 4

Observations of xanthan-mixed cesium/potassium formate gels (1.92 g/mL (16 lbm/gal)) at various pH values and a xanthan concentration of 7.2 g/L (60 ppt).

| Sample | pH | Observation | | | |
|---|---|---|---|---|---|
| | | 2 hours | 6.5 hours | 17 hours | 3 days |
| A4 | 11.5 | P | P | S | S |
| B4 | 8.5 | P | P | P | P |

Notes for Table 4:
"S": Solid plug (hydrogel)
"P": Pourable gel

The data in Table 4 indicate that using a mixed cesium/ potassium formate brine can help delay the onset of hydrogel formation, and that pH adjustment is also effective in these mixed brines to delay the onset of hydrogel formation. Comparing Samples A3 and A4 indicates that where it is possible to use a lower density brine, dilution with potassium formate brine can be used to further delay hydrogel formation.

Example 5

Effect of pH in Mixed Sodium Formate/Cesium Formate Brine

The brine used in Samples A5 and B5 was prepared by mixing saturated sodium formate brine with saturated cesium formate brine to a density of 1.92 g/mL (16 lbm/gal). Sample A5 was prepared by adding 1.5 mL XS to 100 mL of the mixed brine as described above to provide a xanthan polymer concentration of 7.2 g/mL (60 ppt). The pH of this fluid was modified to 11.5, measured without dilution. Sample B5 was prepared in a similar manner except that the pH of the brine was modified to 8.5 prior to the xanthan addition. The fluids were observed at periodic intervals and the observations are noted in Table 5.

TABLE 5

Observations of xanthan-mixed cesium/sodium formate gels (1.92 g/mL (16 lbm/gal)) at various pH values and a xanthan concentration of 7.2 g/L (60 ppt).

| | | Observation | | | |
|---|---|---|---|---|---|
| Sample | pH | 2 hours | 6.5 hours | 1 day | 3 days |
| A5 | 11.5 | P | S | S | S |
| B5 | 8.5 | P | P | P | P |

Notes for Table 5:
"S": Solid plug (hydrogel)
"P": Pourable gel

The data in Table 5 indicate pH adjustment is also effective in these mixed brines to delay the onset of hydrogel formation.

As shown in the above examples, solid hydrogel formation in xanthan-cesium formate brines is dependent on xanthan concentration, pH of the fluid, brine density, the presence of sodium and/or potassium formate brines, and time. Based on these factors, the above examples provide a guide for carrying out the decision making process to determine an optimum pH of the fluid at which it does not form hydrogels for the time required, and at which the fluid can be broken at the bottomhole temperature at a preferred rate. In another embodiment, the amount of time between xanthan hydration and treatment is ascertained, and the xanthan concentration, pH and/or brine density are adjusted to obtain the desired time plus any suitable buffer before hydrogel (plug) formation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method, comprising:
   mixing a gelling agent comprising xanthan polymer in a brine comprising cesium formate to form a mixture of the xanthan polymer in the brine, wherein the mixture has a density of at least 1.44 g/mL (12 lbm/gal);
   lowering the pH of the brine;
   hydrating the xanthan polymer, wherein the xanthan polymer is hydrated in a first aqueous solution of cesium formate, potassium formate, sodium formate or a combination thereof, and wherein the density of the first aqueous solution is thereafter increased by adding concentrated cesium formate; and
   treating a subterranean formation with the mixture.

2. The method of claim 1 wherein the pH of the brine is lowered below 11.

3. The method of claim 1 wherein the pH of the brine is lowered to between 7 and 11.

4. The method of claim 1 wherein the lowering of the pH comprises adding acid to the brine.

5. The method of claim 4 wherein the acid comprises an organic acid.

6. The method of claim 1 wherein the lowering of the pH comprises adding acid to the brine in advance of the mixing of the gelling agent.

7. The method of claim 1 wherein the lowering of the pH comprises adding acid to the brine concurrently with the mixing of the gelling agent.

8. The method of claim 1 wherein the lowering of the pH comprises adding acid to the mixture before any solid hydrogel formation.

9. The method of claim 1 wherein the mixture has a density of at least 1.56 g/mL (13 lbm/gal).

10. The method of claim 1 wherein the mixture has a density of at least 1.8 g/mL (15 lbm/gal).

11. The method of claim 1 wherein the brine comprises a combination of cesium formate with sodium formate, potassium formate or a combination thereof.

12. The method of claim 1 wherein the xanthan polymer is hydrated in the mixture during or after the mixing.

13. The method of claim 1 comprising hydrating the xanthan polymer in a pre-batch, wherein the pre-batch has a density less than the density of the mixture in the formation treatment.

14. The method of claim 1 wherein the concentrated cesium formate comprises cesium formate solids, a saturated cesium formate slurry or a concentrated aqueous solution of cesium formate wherein the concentrated solution has a higher density than that of the first aqueous solution.

15. The method of claim 1 wherein the treatment comprises gravel packing, hydraulic fracturing or a combination thereof.

16. The method of claim 15 wherein the treatment comprises alternate-path delivery of the mixture to the formation.

17. The method of claim 1 wherein the mixture further comprises a shale stabilizer, a proppant, a crosslinker for the xanthan polymer, a breaker for the xanthan polymer, a filter cake removal agent, a friction reducer or a combination thereof.

18. The method of claim 17 wherein the breaker comprises an alkali metal bromate.

19. A method, comprising:
   determining the treatment density, viscosity and time window for a treatment of a subterranean formation with a mixture of xanthan polymer in a cesium formate brine;
   determining a maximum pH required to maintain pumpability of the mixture over the treatment time window;

mixing a gelling agent comprising the xanthan polymer in the cesium formate brine to form the mixture of the xanthan polymer in the brine, wherein the mixture has the determined treatment density and viscosity; adding acid before, during or after the mixing in an amount effective to lower the pH of the mixture to less than a value that is 0.5 pH units below the determined maximum pH to maintain pumpability; and treating the subterranean formation with the mixture.

20. A method of delaying onset of solid hydrogel formation in a gel comprising cesium formate brine viscosified with xanthan polymer and having a density of at least 1.44 g/mL (12 lbm/gal), comprising introducing acid into the brine in an amount effective for a pH from 7 to 11, wherein the acid introduction is before, during or after xanthan viscosification and prior to hydrogel formation, wherein the hydrogel formation in the acidified gel occurs at a later time relative to the same gel at a natural pH.

21. The method of claim 19, wherein the xanthan polymer is hydrated in a first aqueous solution of cesium formate, potassium formate, sodium formate or a combination thereof, and wherein the density of the first aqueous solution is thereafter increased by adding concentrated cesium formate.

* * * * *